(12) United States Patent
SeyedzadehDelcheh et al.

(10) Patent No.: US 11,663,073 B2
(45) Date of Patent: May 30, 2023

(54) METHOD AND APPARATUS FOR DATA PROTECTION IN MEMORY DEVICES

(71) Applicant: Advanced Micro Devices, Inc., Santa Clara, CA (US)

(72) Inventors: SeyedMohammad SeyedzadehDelcheh, Bellevue, WA (US); Sergey Blagodurov, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/118,434

(22) Filed: Dec. 10, 2020

(65) Prior Publication Data

US 2022/0188185 A1 Jun. 16, 2022

(51) Int. Cl.
*G06F 11/10* (2006.01)
*G06F 11/30* (2006.01)

(52) U.S. Cl.
CPC .................................. *G06F 11/10* (2013.01)

(58) Field of Classification Search
None
See application file for complete search history.

(56) References Cited

U.S. PATENT DOCUMENTS

| | | |
|---|---|---|
| 4,727,474 A | 2/1988 | Batcher |
| 5,263,032 A | 11/1993 | Porter et al. |
| 5,390,308 A | 2/1995 | Ware et al. |
| 6,135,935 A | 10/2000 | Kivioja et al. |
| 6,137,645 A * | 10/2000 | Harumatsu ........ G11B 27/3027 |
| 6,438,726 B1 | 8/2002 | Walters, Jr. |
| 6,675,344 B1 | 1/2004 | Sharma |

(Continued)

FOREIGN PATENT DOCUMENTS

| | | |
|---|---|---|
| WO | 03102965 A1 | 12/2003 |
| WO | 2016140765 A2 | 9/2016 |

OTHER PUBLICATIONS

International Search Report and Written Opinion in International Application No. PCT/US2008/003365, dated Jul. 21, 2008, 13 pages.

(Continued)

*Primary Examiner* — Cynthia Britt
*Assistant Examiner* — Dipakkumar B Gandhi
(74) *Attorney, Agent, or Firm* — Kowert Hood Munyon Rankin and Goetzel PC; Rory D. Rankin

(57) ABSTRACT

An apparatus and method for efficiently transmitting data are described. A transmitter sends data to a receiver. An encoder of the transmitter divides a received first block of data into multiple sub-blocks. The encoder selects a portion of each sub-block to compare to one another. A portion in a particular sub-block has a same offset and a same size as other portions of other sub-blocks. If the encoder determines the multiple portions match one another, the encoder sends, to the receiver, a second block of data corresponding to the first block of data. The second block of data has a same size as a size of the received first block of data, and the second block of data includes security data from one of multiple error correction schemes. Therefore, the second block of data provides security without increasing an amount of data to transmit.

20 Claims, 7 Drawing Sheets

(56) References Cited

U.S. PATENT DOCUMENTS

| | | | |
|---|---|---|---|
| 6,891,818 B1* | 5/2005 | Jarvisalo | H04L 29/06 370/337 |
| 6,965,537 B1 | 11/2005 | Klein et al. | |
| 7,308,621 B2 | 12/2007 | Adams et al. | |
| 9,980,252 B2* | 5/2018 | Kwon | H04L 1/0028 |
| 2002/0083394 A1 | 6/2002 | Hall et al. | |
| 2002/0174398 A1 | 11/2002 | Furutani | |
| 2003/0103429 A1* | 6/2003 | Senshu | G11B 27/24 369/47.24 |
| 2003/0212694 A1* | 11/2003 | Potapov | G06F 16/24557 |
| 2004/0117722 A1* | 6/2004 | Harada | H03M 13/23 714/800 |
| 2005/0278602 A1* | 12/2005 | Oogami | H04L 1/0041 714/752 |
| 2006/0161756 A1* | 7/2006 | Yagisawa | G06F 12/0866 711/171 |
| 2007/0061503 A1 | 3/2007 | Chiang et al. | |
| 2007/0136637 A1* | 6/2007 | Majima | H04L 1/0045 714/758 |
| 2008/0094899 A1 | 4/2008 | Honma et al. | |
| 2011/0096854 A1* | 4/2011 | Fanson | H04L 27/2634 375/260 |
| 2012/0233135 A1* | 9/2012 | Tofano | G06F 16/24556 707/E17.002 |
| 2013/0311848 A1 | 11/2013 | Purohit | |
| 2014/0359392 A1* | 12/2014 | Hwang | H04L 1/0065 714/755 |
| 2015/0052300 A1* | 2/2015 | Piekarski | G06F 3/0667 711/114 |
| 2016/0241890 A1* | 8/2016 | Park | H04N 21/20 |
| 2018/0077428 A1 | 3/2018 | Dhuse et al. | |
| 2019/0324674 A1* | 10/2019 | Ippatapu | G06F 3/067 |

OTHER PUBLICATIONS

Examination Report in Application No. GB0916720.6, dated Jan. 20, 2011, 2 pages.

Examination Report in Application No. GB0916720.6, dated Mar. 30, 2011, 1 page.

International Search Report and Written Opinion in International Application No. PCT/US2021/054446, dated Feb. 10, 2022, 20 pages.

* cited by examiner

METHOD AND APPARATUS FOR DATA PROTECTION IN MEMORY DEVICES

This invention was made with Government support under PathForward Project with Lawrence Livermore National Security (Prime Contract No. DE-AC52-07NA27344, Subcontract No. B620717) awarded by the United States Department of Energy. The Government has certain rights in this invention.

BACKGROUND

Description of the Relevant Art

When transferring information between functional blocks in a semiconductor chip, electrical signals are sent on multiple, parallel metal traces. A transmitter sends the electrical signals across the parallel metal traces. A receiver receives the electrical signals. The metal traces have transmission line effects such as distributed inductance, capacitance and resistance throughout its length. For modern integrated circuits, the interconnect capacitance reduces signal integrity and signal transfer rate more so than gate capacitance of semiconductor devices. The interconnect capacitance per unit length includes both sidewall fringing capacitance and cross-coupling capacitance. For example, the electromagnetic fields for the metal traces conducting signals and the return current on the ground plane create electrical interference on neighboring metal traces and on adjacent devices. As the operating voltage continue to decrease to reduce power consumption and short channel effects, the signal swing used for Boolean logic decreases as well as the noise margin.

A simultaneous switching of a wide bus may cause a significant voltage drop if a supply pin served all of the line buffers on the bus. Parasitic inductance increases transmission line effects on a chip such as ringing and reduced propagation delays. The resulting voltage drop is proportional to the expression L di/dt, wherein L is the parasitic inductance and di/dt is the time rate of change of the current consumption. Now a node that holds a logic high value may experience a voltage drop that reduces its voltage value below a minimum threshold. For memories and latches without recovery circuitry, stored values may be lost. Power supply currents flowing through non-zero resistance wires also create an IR (current-resistance) voltage drop, which contributes to data retention corruption and timing failures in critical paths.

In view of the above, methods and mechanisms for efficiently transmitting data are desired.

Figure 1:
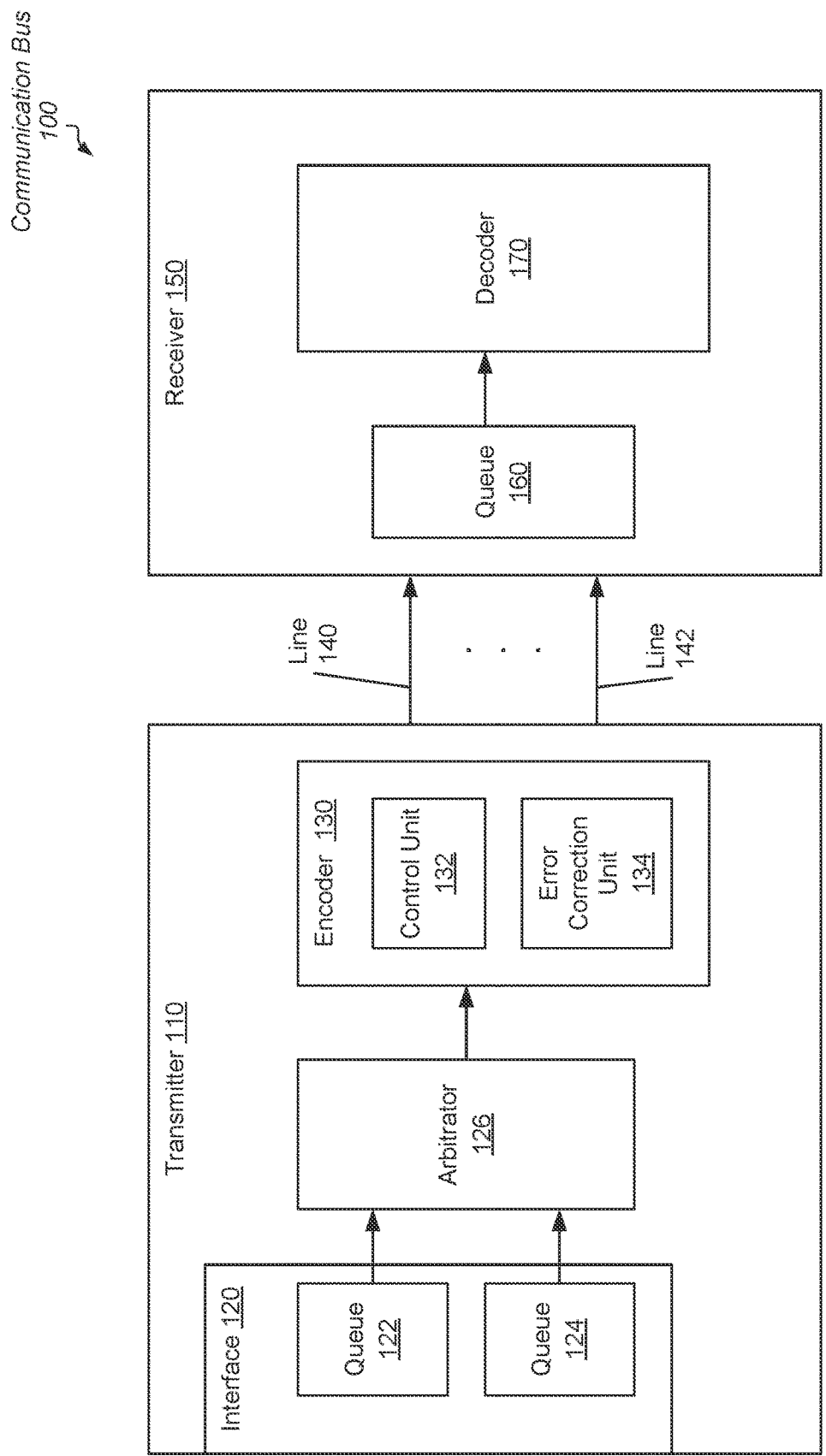
FIG. 1 is a generalized diagram of one embodiment of a communication bus.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently transmitting data are contemplated. In various embodiments, a computing system includes a transmitter sending data to a receiver. The transmitter and the receiver are components used on a communication bus between varieties of functional blocks used to process a variety of applications. In some examples, the communication bus is located between a memory controller and a memory device. In other examples, the communication bus is located between processing units located on a same die, located on separate dies in a system on a chip (SoC) package, or located on separate chips on a motherboard. The transmitter includes an encoder with at least a control unit and an error correction unit. The error correction unit is capable of selecting one of multiple error correction schemes. The error correction schemes generate security data corresponding to data to transmit. This security data is used to both identify and correct any errors in received payload data, rather than simply detect errors in the received payload data. In some embodiments, the error correction schemes are error code correction (ECC) schemes and the security data is an error correction code. Examples of the ECC schemes are a Hamming code scheme, a binary convolution code scheme, a Reed-Solomon code scheme, and a low-density parity check code scheme.

The encoder of the transmitter receives a first block of data to transmit. This first block of data includes any packet header and other metadata in addition to the payload data to send to the receiver. The encoder divides the received first block of data into multiple sub-blocks of data. Afterward, the encoder selects a portion of each sub-block to compare to one another. In various implementations, the portion selected in a particular sub-block has a same offset and a same size as other portions of other sub-blocks. After comparing, if the encoder determines the multiple portions from the multiple sub-blocks match one another, the encoder sends, to the receiver, a second block of data corresponding to the first block of data. The second block of data has a same size as a size of the received first block of data, and the second block of data includes security data from one of the multiple error correction schemes. Additionally, the second block of data includes a same number of sub-blocks as the first block of data. Therefore, the second block of data provides security without increasing an amount of data to transmit. The steps for generating the second block of data are further described in the following discussion.

Turning to FIG. 1, a generalized block diagram of one embodiment of a communication bus 100 is shown. As shown, communication bus 100 includes a transmitter 110 capable of sending information as electrical signals, transmission lines 140-142 for transferring the electrical signals, and receiver 150 capable of receiving the signals. The number of transmission lines 140-142 can be any number and the number is based on design requirements. Although not shown for ease of illustration, each of the transmitter 110 and the receiver 150 includes circuitry for each of the transmission lines 140-142 for driving the electrical signals and for receiving the electrical signals, respectively. For example, both active devices, such as transistors, and passive devices, such as resistors, capacitors and inductors, are used one either end of the transmission lines 140-142. This circuitry provides termination and sampling capabilities for the receiver 150 and this circuitry supports a particular communication protocol. The communication protocol determines values used for information transfer such as a number of data transfers per clock cycle, signal voltage levels, signal timings, signal and clock phases and clock frequencies.

It is noted that the term "bus" may also be referred to as a "channel," and each "transmission line" is a "lane" or a "trace" or a "wire." In various embodiments, transmission lines 140-142 are constructed from a variety of suitable metal sources during semiconductor fabrication and surrounded by a variety of any suitable insulating material. It is also noted that the terms "pin," "port," "terminal," and "node" are used interchangeably herein. Depending on the design, the transmission lines 140-142 are placed between a memory controller and a memory device, or between processing units located on a same die, or between processing units located on separate dies in a system on a chip (SoC) package, or between processing units located on separate chips on a motherboard, or between clusters in a communication fabric. Other designs and placement of the transmission lines 140-142 are possible and contemplated. Although one transmitter 110 and one receiver 150 is shown, in other embodiments, any number of these components is used as well as any number of subcomponents within the transmitter 110 and the receiver 150.

The transmitter 110 receives data to send on the transmission lines 140-142 via the interface 120, and stores the data in one of the queues 122-124. In some embodiments, the interface 120 selects one of the queues 122-124 for storing received data based on criteria such as a source of the data, a type of request or command associated with the data, a priority level of the data, and so forth. Arbitrator 126 includes circuitry for selecting data to retrieve from the queues 122-124 and send to the encoder 130. The arbitrator 126 selects data from the queues 122-124 based on a variety of factors such as priority levels, a quality of service (QoS) parameter, an age of the data, a source of the data, a round robin selection scheme, and so forth.

The encoder 130 includes at least a control unit 132 and an error correction unit 134. In some embodiments, the error correction unit 134 includes circuitry for performing a variety of error correction schemes used for both detecting errors in transmitted data and correcting one or more errors in the transmitted data. Examples of the error correction schemes are a Hamming code scheme, a binary convolution code scheme, a Reed-Solomon code scheme, and a low-density parity check code scheme. In other embodiments, the error correction unit 134 uses a table or other memory for storing indications of available error correction schemes, and sends a command to an external unit with an indication of a selected one of the multiple available error correction schemes and a copy of data to protect. Later, the error correction unit 134 receives the results, which are used to send data across the transmission lines 140-142.

The control unit 132 attempts to send an output block of data corresponding to a received block of data with a same size as the received block of data while also including security data. To do this, the control unit 132 divides a received block of data into multiple sub-blocks of data. In one example, the first block of data includes 64 bytes, and the encoder of the transmitter divides this 64-byte first block of data into 8 8-byte sub-blocks. In one implementation, the encoder selects a most significant byte of the sub-blocks as portions to compare. In this case, for each portion, the offset is zero within a corresponding sub-block and the size is one byte. If the control unit 132 determines that the 8 1-byte portions of the 8 sub-blocks match one another, then the encoder determines an amount of security data to send. To do so, the control unit 132 prevents including one or more copies of the portion in an output block of data to send on the transmission lines 140-142. For example, the control unit 132 prevents including 7 of the copies of the portion in the output block of data, which provides 57 bits ((64 bytes−7 bytes)/8 sub-blocks) per 8-byte sub-block for storing security data.

The encoder 132 selects one of the available error correction schemes based on matching the 57 bits per 8-byte sub-block and an input data size of one of the available error correction schemes. In an embodiment, the encoder selects a Hamming code (64, 57, 7) scheme as a selected error correction scheme. The first parameter of the Hamming code scheme includes a code word size, such as 64 bits, that includes the original data in addition to the security data. The second parameter of the Hamming code scheme includes an input data size, such as 57 bits, that includes the original data to transmit. The third parameter of the Hamming code scheme includes a size of the security data such as 7 bits. It is noted that the terms "security data," "security bits," "auxiliary data," "auxiliary bits," "redundant data," "redundant bits," are used interchangeably herein.

For each sub-block of the output block of data, the encoder 130 generates and inserts 7 generated redundant bits based on the Hamming code (64, 57, 7) scheme, which are the security data. Therefore, each sub-block of the output block of data includes 57 bits of original data from the received 64-byte block of data and corresponding 7 redundant bits using the Hamming code (64, 57, 7) scheme. Accordingly, each sub-block of the output block of data has a size of 8 bytes. With 8 sub-blocks, the output block of data has a total size of 64 bytes (8 sub-blocks×8 bytes/sub-block). Therefore, the output block of data has a same size as the received block of data despite additionally storing security data used to both detect and correct one or more bit errors that occur during data transmission. The encoder also inserts an indication in the metadata of the output block of data specifying the selected error correction scheme such as the Hamming code (64, 57, 7) scheme.

The queue 160 receives the block of data sent by the transmitter 110. The decoder 170 of the receiver 150 inspects a particular field of the header or other metadata to search for the indication of the selected error correction scheme. The decoder 170 uses the error correction scheme specified by the indication for verifying and possibly correcting the received block of data. The decoder 170 is also capable of retrieving a copy of a portion of data that is invariant across sub-blocks. For example, when the portions are the most significant bytes of the sub-blocks, at least one of the sub-blocks still includes a copy of the portion. The decoder 170 generates the original block of data from the retrieved portion and the verified (and corrected) data. Afterward, the decoder 170 sends the generated data to other processing circuitry. It is noted that the subcomponents, such as the control unit 132, the decoder 170, and so on, are implemented with hardware, such as circuitry, to perform the above steps to transmit data from the transmitter 110 to the receiver 150.

Figure 2:
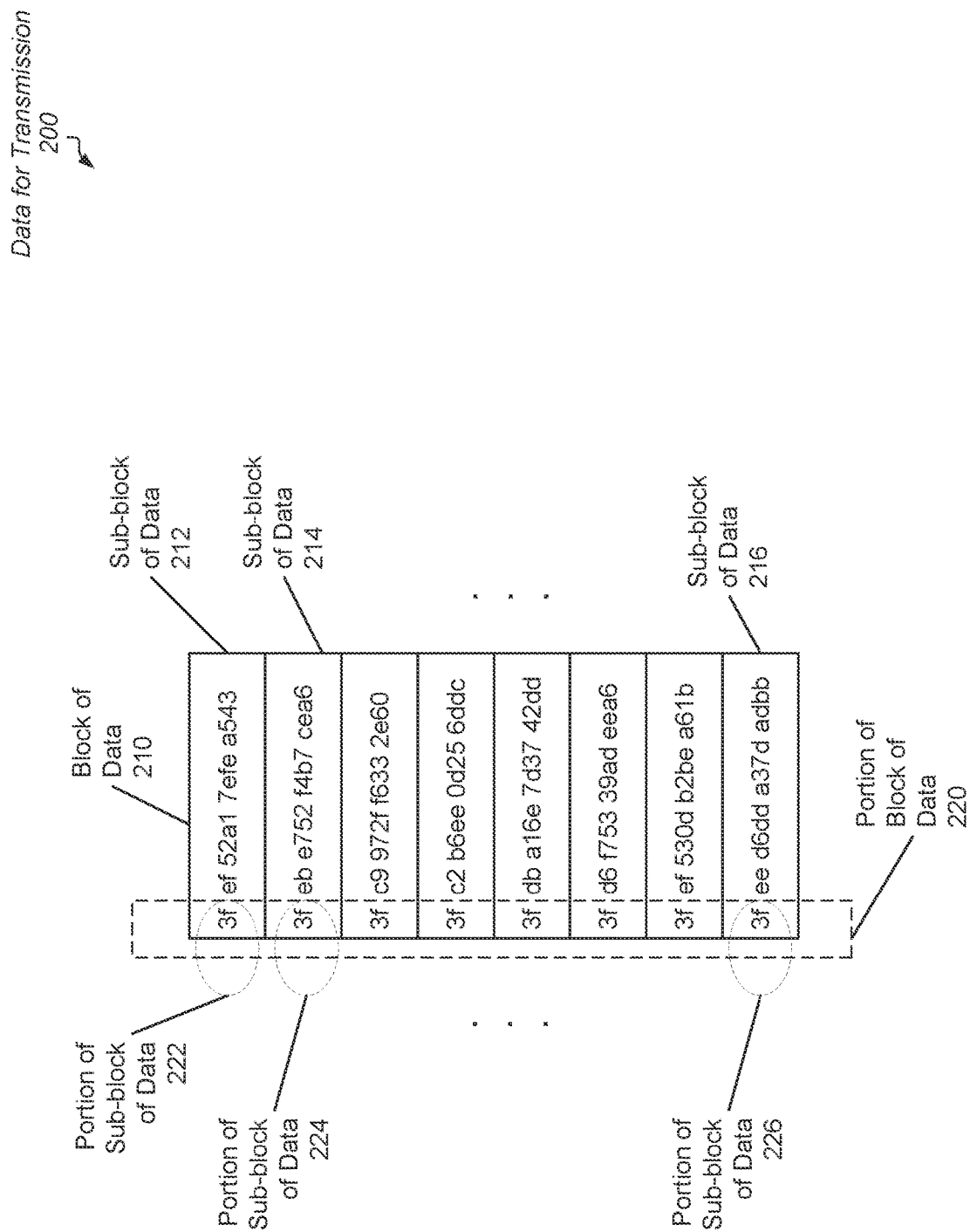
FIG. 2 is a generalized diagram of one embodiment of data for transmission.

Turning now to FIG. 2, a generalized block diagram of one embodiment of data for transmission 200 is shown. Processing circuitry generates the block of data 210 and a transmitter receives the block of data 210 to further process before sending to a receiver. In the illustrated embodiment, the block of data 210 has a size of 64 bytes although other data sizes are possible and contemplated. It is noted that the block of data 210, in some examples, is payload data, and a command or a message or a header associated with the payload data can be sent separately from the payload data. The contents of the block of data 210 is shown with hexadecimal numerals. Each of the hexadecimal numerals represents 4 bits. Although other configurations are possible, the block of data 210 has the most significant bytes located on the left.

An encoder of a transmitter divides the block of data 210 into multiple sub-blocks. Here, the block of data 210 is divided into eight 8-byte sub-blocks shown as sub-blocks 212, 214 and 216. The encoder of the transmitter compares a portion of each of two or more sub-blocks of data 212-216 to one another. In one example, the encoder of the transmitter selects a most significant byte of each of the sub-blocks 212-216 to compare (e.g., portions 222, 224, . . . 226). The most significant byte of sub-blocks 212-216 is illustrated as portion 220. For this example, the offset is zero within a corresponding sub-block and the size of the portion is one byte. In other examples, the offset and size may be different. As can be seen in the illustrated example, each of these bytes has the same value of 3f.

It is noted that particular workloads using blocks of data of a same data type tend to have similarity across the blocks of data. For example, double precision Floating Point (FP) workloads include high bit similarity across blocks of data such as 64-bit words. The main reason for high similarity is that one sign bit and 11 exponent bits change slightly across 64-bit words. Therefore, the transmitter is able to prevent including one or more of the bytes of the portion of data 220 in an output block of data to send to a receiver. The transmitter is also able to insert security data in the output block of data, which has a same 64-byte size as the original block of data 210. Therefore, power consumption is reduced with less data being transmitted despite utilizing security data to increase reliability.

Figure 3:
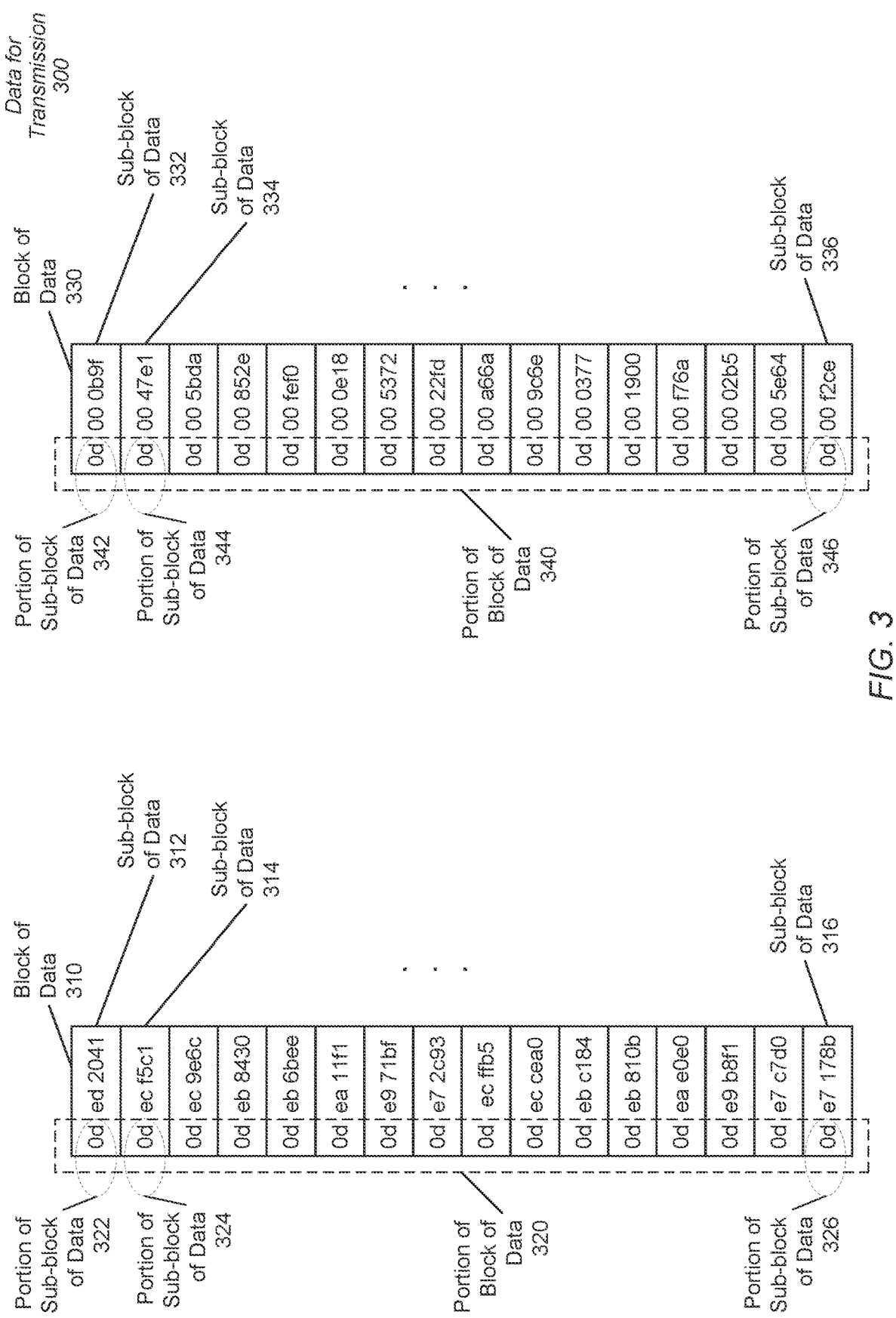
FIG. 3 is a generalized diagram of one embodiment of data for transmission.

Referring to FIG. 3, a generalized block diagram of one embodiment of data for transmission 300 is shown. Similar to the block of data 210 (of FIG. 2), processing circuitry generates the block of data 310 and the block of data 330, and a transmitter receives the blocks of data 310 and 330 to further process before sending to a receiver. In the illustrated embodiment, the blocks of data 310 and 330 have a size of 64 bytes although other data sizes are possible and contemplated. An encoder of a transmitter divides the blocks of data 310 and 330 into 16 4-byte sub-blocks shown as sub-blocks 312, 314 and 316, and sub-blocks 332, 334 and 336. In some embodiments, the encoder of the transmitter selects a most significant byte of the sub-blocks as portions to compare.

The most significant byte of the sub-blocks 312-316 are shown as portion 320. Similarly, the most significant byte of the sub-blocks 332-336 are shown as portion 340. In this case, the bytes located on the left of the sub-blocks 312-316 are the selected portions (i.e., 322, 324, . . . 326). Similarly, the bytes located on the left of the sub-blocks 332-336 are the selected portions (i.e., 342, 344, . . . 346).

Each of the portions of block of data 320 and the portions of block of data 340 is selected in a manner similar to that described earlier in FIG. 2. As can be seen, each of these bytes of the block of data 310 has the same value 0d. Similarly, each of these bytes of the block of data 330 has the same value 0d. The encoder of the transmitter compares two or more portions of sub-blocks of data 322-326 to one another. Similarly, the encoder of the transmitter compares two or more portions of sub-blocks of data 342-346 to one another.

As noted earlier, particular workloads using blocks of data of a same data type tend to have similarity across the blocks of data. For example, one sign bit and 8 exponent bits for single precision floating-point workloads tend to remain unchanged across 32-bit words as shown for block of data 310. Additionally, the most significant bytes of integer workloads tend to remain unchanged across 32-bit words as shown for block of data 330. The high similarity across data words provides an opportunity to prevent including one or more copies of the similar data in an output block of data and instead include security data. Therefore, the output block of data does not have a greater data size than the data size of the original block of data despite storing security data. Therefore, power consumption due to data transmission reduces while data reliability increases.

As described earlier, data, such as blocks of data 310 and 330, are transmitted over a communication bus between varieties of types of components. In some embodiments, the communication bus is between a memory controller and a memory device and the memory device supports error correction schemes due to a demand for high reliability. The memory device includes one of a variety of random access memory (RAM), such as a variety of dynamic random access memory (DRAM), one of a variety of non-volatile (NV) dual in-line memory modules (DIMMs) such as NVDIMM-P, one of another type of data storage technologies such as phase-change memories (PCM), ferroelectric memories (FeRAM), magnetoresistive memories (MRAM), resistive memories (ReRAM or RRAM), three dimensional (3D) cross-point (XPoint) memories, and so forth. When the memory device is used in a computing system processing applications for the medicine field, finance and banking field, science field, and so forth, the error correction schemes are used to increase reliability despite these schemes consuming more power. However, as described earlier, it is possible to receive input data and generate output data to transmit on a communication bus without increasing the data size despite adding security data. Additionally, such steps are performed for other interfaces besides between a memory controller and a memory device.

Figure 4:
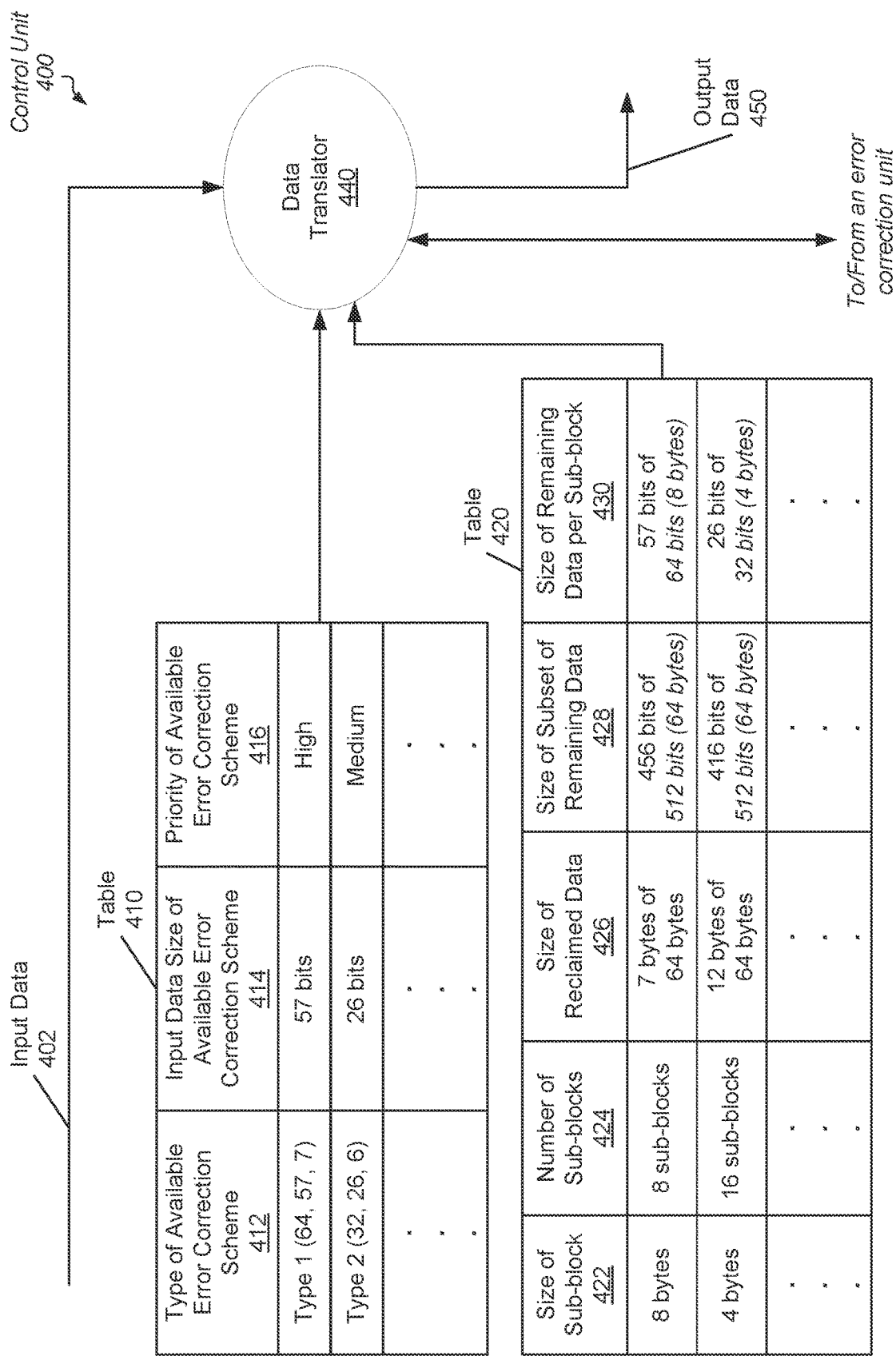
FIG. 4 is a generalized diagram of one embodiment of a control unit of an encoder in a transmitter.

Turning now to FIG. 4, a generalized block diagram of one embodiment of a control unit 400 of a transmitter is shown. In the illustrated embodiment, the control unit 400 includes a data translator 440 that receives input data 402 and generates the output data 450 to send on a communication bus. Circuitry, such as hardware circuits, are used to implement the data translator 440. The data translator 440 uses information from tables 410-420 and an external error correction unit when generating the output data 450. Access circuitry of the tables 410-420 is not shown for ease of illustration. Tables 410-420 use circuitry to store information, and this circuitry is used to implement any of a variety of memories. For example, the circuitry implements one or more of a random access memory, registers, flip-flop circuits, a queue, a content addressable memory (CAM), and so forth.

Table 410 uses multiple fields such as fields 412-416. Other fields not shown are also possible and contemplated such as a status field with a valid bit, an index field to identify a row in table 410, another index field that is later mapped to a corresponding error correction scheme to use, and so forth. Field 412 stores an indication of an error correction scheme. As described earlier, examples of error correction schemes are a Hamming code scheme, a binary convolution code scheme, a Reed-Solomon code scheme, and a low-density parity check code scheme. One or more of these schemes include a variety of types. For example, supported Hamming code schemes include one or more of a Hamming code (128, 120, 8) scheme, a Hamming code (64, 57, 7) scheme, a Hamming code (32, 26, 6) scheme, and a Hamming code (16, 11, 5) scheme.

Field 414 stores an input data size of the available error correction scheme. For example, the input data size of the Hamming code (64, 57, 7) scheme is 57 bits. Field 416 stores a priority level of a corresponding error correction scheme. When two or more available error correction schemes are capable of providing security data for data to transmit, the control unit 400 selects the error correction scheme with the highest priority level. In some cases, the priority level increases with increasing input data size. In other cases, the priority level is set based on other criteria.

Table 420 stores at least fields 422-430. Similar to table 410, it is possible and contemplated that table 420 includes other fields not shown such as a status field with a valid bit to indicate a valid entry or row in the table. Field 422 stores one of the supported sizes of a sub-block. For example, when a block of data to be transmitted has a size of 64 bytes, it is possible to divide the block of data into 8 8-byte sub-blocks, 16 4-byte sub-blocks, or other. Field 424 stores a number of sub-blocks included in the block of data. Field 426 stores an amount of reclaimed data to use for an output block of data once the number and size of sub-blocks is known. This is the amount of data prevented from being included in the output block of data.

Field 428 stores the amount of the original data to include in the output block of data once it is known how much data to prevent including in the output block of data. For example, for a received block of data with a size of 64 bytes, when the control unit 400 divides the block of data into 16 4-byte sub-blocks, and determines a most significant 1-byte portion of data in each of the sub-blocks match one another, the control unit 400 prevents including 12 of the 16 1-byte portions in the output block of data. The determination of preventing 12 portions, rather than 8 portions or 15 portions or another number of portions, is further described in method 600 (of FIG. 6). With 12 1-byte portions prevented from being included in the output block of data, the amount of the original 64 bytes of data placed in the output block of data is 52 bytes or 416 bits.

Field 430 stores a size of remaining data per sub-block. For example, dividing the 416 bits by the 16 sub-blocks provides 26 bits per sub-block to use for storing original data of the received block of data. Since the size of the sub-block is 4 bytes, which is stored in field 422, there are 6 remaining bits for storing security data in the sub-block. It is noted that the control unit 400 compares the information stored in field 430 of table 420 to the information stored in field 414 of table 410 to determine which error correction scheme to select.

It is noted that table 410 stores information of non-default error correction schemes. When the received data 402 is divided into sub-blocks with portions that match across the sub-blocks, the control unit 400 uses a non-default error correction scheme to generate output data 450. In some implementations, the size of the output data 450 is no greater than the combined size of the input data 402 and the security data. In some embodiments, the control unit 400 uses a non-default error correction scheme to generate the output data 450 with a same size as the input data 402 despite placing security data in the output data 450. For example, each of the input data 402 and the output data 450 has a size of 64 bytes.

When the input data 402 does not have matching portions across sub-blocks, the control unit uses a default error correction scheme to generate the output data 450, which has a size larger than the input data 402 due to placing security data in the output data 450. For example, when the default type of error correction scheme is the Hamming code (72, 64, 8) scheme, and the input data 402 has a size of 64 bytes, and each of 8 sub-blocks has a size of 8 bytes (64 bits) with no matching portion across sub-blocks, the size of the output data 450 is greater than 64 bytes. The output data 450 has 72 bits per sub-block with 64 bits of original data from the input data 402 and 8 bits of redundant bits for the security data generated by the Hamming code (72, 64, 8) scheme. With 72 bits per sub-block and 8 sub-blocks, the total size of the output data 450 is 576 bits, or 64 bytes with 64 bits of generated redundant bits as security data.

Figure 5:
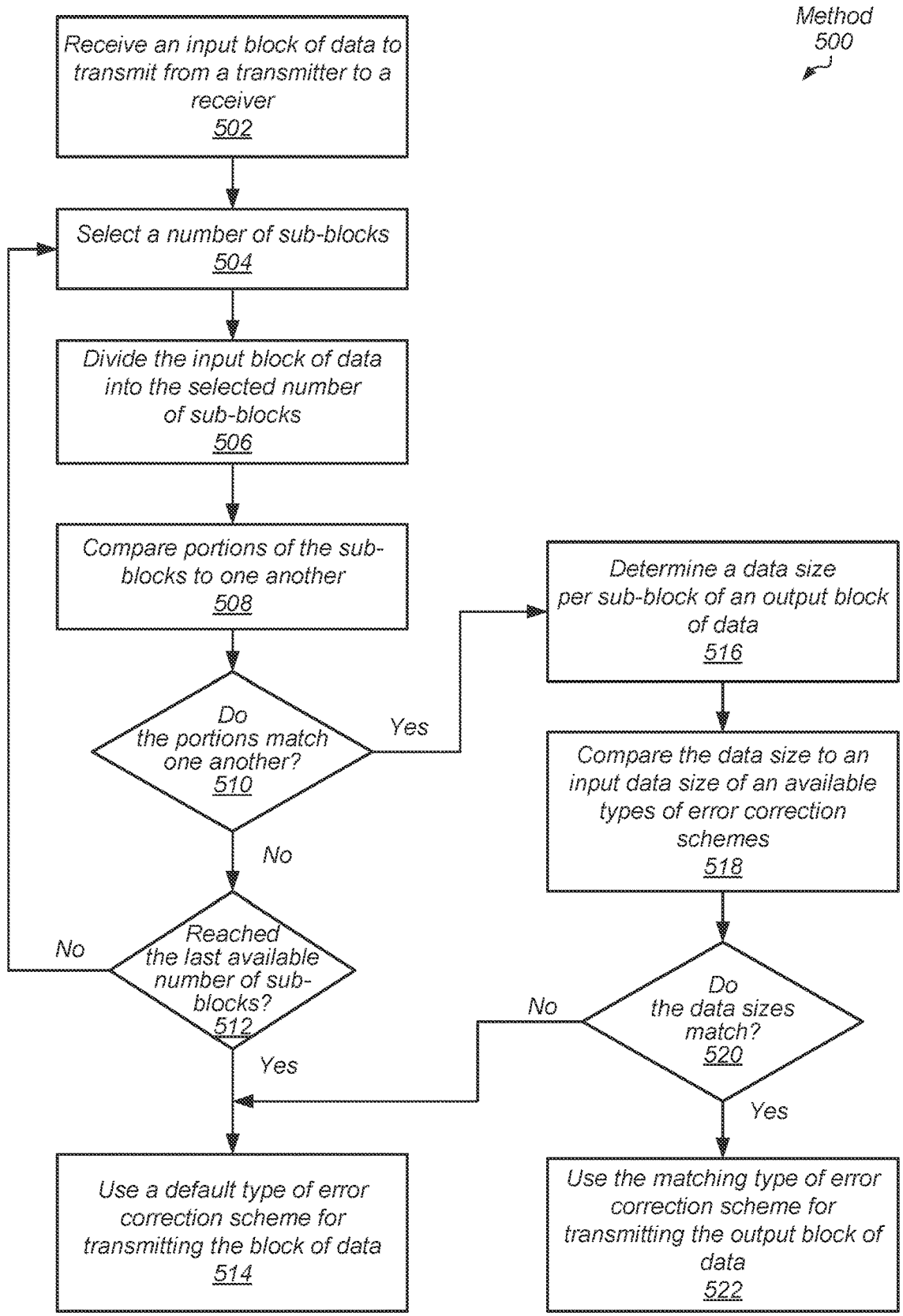
FIG. 5 is a generalized diagram of one embodiment of a method for efficiently transmitting data.

Referring now to FIG. 5, one embodiment of a method 500 for efficiently transmitting data is shown. For purposes of discussion, the steps in this embodiment (as well as in FIGS. 6-7) are shown in sequential order. However, in other embodiments some steps occur in a different order than shown, some steps are performed concurrently, some steps are combined with other steps, and some steps are absent.

An encoder of a transmitter receives an input block of data to transmit to a receiver (block 502). The encoder selects a number of sub-blocks for the received input block of data (block 504), and divides the block of data into the selected number of sub-blocks (block 506). The encoder compares a portion of each of two or more sub-blocks of the selected number of sub-blocks of data to one another (block 508). In some embodiments, a portion is selected for comparison from all of the sub-blocks. The selected portions have a same offset and size within a corresponding sub-block. In an example, the encoder selects a most significant byte of the two or more sub-blocks for comparison. In such an example, for each portion to compare, the offset is zero and the size is one byte. However, in other examples, the number of sub-blocks from which to select a portion has a different value. Similarly, in other examples, the offset and the size of the portion have different values.

If the encoder determines the compared portions do not match one another ("no" branch of the conditional block 510), and if the encoder has not reached the last available number of sub-blocks to compare ("no" branch of the conditional block 512), then control flow of method 500 returns to block 504 where the encoder selects another number of sub-blocks for the received block of data. As noted earlier, in some embodiments, the steps performed in blocks 504-512 are performed concurrently, rather than serially. In such embodiments, the encoder concurrently performs the steps of blocks 504-512 for multiple selected numbers of sub-blocks.

In one example, the encoder selects a number of 8 sub-blocks and concurrently selects another number of 4 sub-blocks. When the received input block of data has a size of 64 bytes, there are eight 8-byte sub-blocks for the first choice of the number of sub-blocks and there are 16 4-byte sub-blocks for the second choice. Therefore, in one example, the encoder compares the most significant byte of each of the eight 8-byte sub-blocks with one another, and concurrently, compares the most significant byte of each of the 16 4-byte sub-blocks with one another. Although the comparisons are performed concurrently, in some designs, the choice of 8 sub-blocks has a higher priority than the choice of 4 sub-blocks. The priority is used when there are matches found for all of the portions of the eight 8-byte sub-blocks and there are matches found for all of the portions of the 16 4-byte sub-blocks.

Returning to the conditional block 510, if the encoder determines the portions compared do not match one another ("no" branch of the conditional block 510), and if the encoder has reached the last available number of sub-blocks to compare ("yes" branch of the conditional block 512), then the encoder uses a default type of error correction scheme for transmitting the block of data (block 514). When the encoder uses the default type of error correction scheme, the total size of the output block of data is greater than the size of the received input block of data, since security data is added to the received input block of data to generate the output block of data.

Selection of the error correction scheme is based on the size of the output block of data. In various embodiments, the output block of data is divided into a same number of sub-blocks as the input block of data. The size of the output block of data and the data size per sub-block of the output block of data are dependent upon one another and they are used to select the error correction scheme. If the encoder determines the portions to compare of the input block of data match one another ("yes" branch of the conditional block 510), then the encoder determines the data size per sub-block of the output block of data (block 516).

In some embodiments, determining the data size per sub-block of the output block of data in block 516 is done by initially searching a table or other memory such as the table 420 with field 426 (of FIG. 4). Determining the data size per sub-block of the output block of data also determines a size of reclaimed data. An example of the size of the reclaimed data is field 426 of table 420 (of FIG. 4). The size of reclaimed data is the amount of data to remove from the input block of data to generate an intermediate block of data. The encoder generates this intermediate block of data by removing, from the input block of data, one or more portions of the two or more compared portions that match one another. Later, the encoder generates the output block of data by inserting security data into the intermediate block of data. The encoder uses a selected error correction scheme to generate the security data as further described in the below discussion.

In other embodiments, a table or memory, such as table 420 (of FIG. 4), does not yet store such information. Therefore, an iterative process is performed to determine the number of copies of the portion to remove from the input block of data to generate the intermediate block of data. The steps of the upcoming method 600 (of FIG. 6) describe such an iterative process. Once the number of copies of the portion to remove from the input block of data to generate the intermediate block of data block of data is known (from a table search or from a previous iterative process), then the steps of block 516 are performed. In yet other embodiments, a preferred error correction scheme is initially selected, and the input data size of this preferred error correction scheme is used to determine the data size per sub-block of the output block of data. Following, the number of copies of the portion to remove from the input block of data to generate the intermediate block of data block of data is determined. The choice of which steps to prioritize and initially perform is based on what information is already readily available.

When the number of copies of the portion to remove from the input block of data to generate the intermediate block of data block of data is known, such as reading field 426 of table 420 (of FIG. 4), In one example, the received input block of data has a size of 64 bytes, there are eight 8-byte sub-blocks, and the selected portions to compare are the most significant bytes of the eight sub-blocks. In the example, all eight portions match one another, and the encoder determines to remove 7 of the 8 portions from the input block of data to generate the intermediate block of data block of data. Later, the encoder inserts security data into the intermediate block of data to generate the output block of data. Therefore, the output block of data includes 57 bytes of the received input block of data (64−7=57). The encoder distributes the 57 bytes, or 456 bits, into the eight sub-blocks. Therefore, each sub-block of the output block of data includes 57 bits (456/8=57) of original input data from the received 64-byte input block of data.

The encoder compares the determined data size to an input data size of an available types of error correction schemes (block 518). Using the above example, the encoder compares the 57 bit determined data size per sub-block to input data sizes of multiple available types of error correcting schemes. If the determined data size does not match any data sizes of the available types of error correction schemes ("no" branch of the conditional block 520), then control flow of method 500 moves to block 514 where the encoder uses a default type of error correction scheme for transmitting the block of data (block 514).

If the determined data size matches a data size of an available type of error correction schemes ("yes" branch of the conditional block 520), then the encoder uses the matching type of error correction scheme for transmitting the block of data (block 522). For example, the encoder uses the matching type of error correction scheme for generating security data to insert in the intermediate block of data. When the encoder uses the matching type of error correction scheme, the total size of the output block data is no greater than the combined size of the input block of data and the security data. In some embodiments, the total size of the output block data is the same as the size of the received input block of data, since security data consumes data storage space made available by preventing including one or more copies of the portion to compare in the output block of data.

Continuing with the above example, the determined data size of 57 bits matches the input data size of 57 bits for a Hamming code (64, 57, 7). For each sub-block of the output block of data, the encoder generates and inserts 7 generated redundant bits based on the Hamming code, which are the security data. Therefore, each sub-block of the output block of data includes 57 bits of original input data from the received 64-byte input block of data and corresponding 7 redundant bits generated using the Hamming code (64, 57, 7). Accordingly, each sub-block of the output block of data has a size of 8 bytes. With 8 sub-blocks, the output block of data has a total size of 64 bytes (8 sub-blocks×8 bytes/sub-block), which is the same size as the received input block of data. The encoder also inserts an indication in the metadata of the output block of data specifying the matching error correction scheme such as the Hamming code (64, 57, 7). Therefore, a decoder in the receiver is capable of receiving the output block of data, and using at least this indication, generating the original block of data from the received block of data with the security data.

Figure 6:
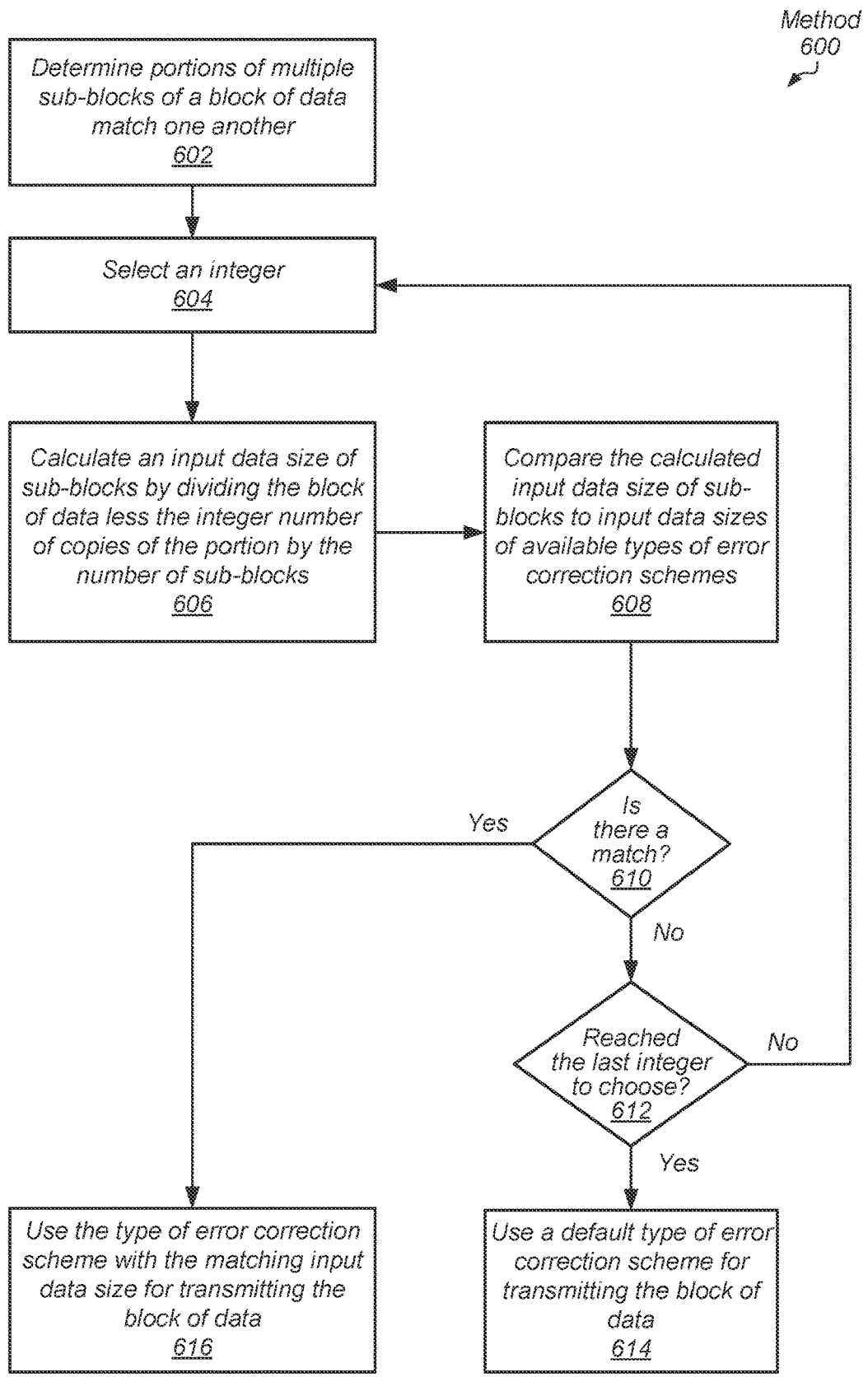
FIG. 6 is a generalized diagram of one embodiment of a method for efficiently transmitting data.

Turning now to FIG. 6, one embodiment of a method 600 for efficiently transmitting data is shown. An encoder of a transmitter has already received a block of data to transmit to a receiver. The encoder has also already divided the received block of data into sub-blocks and compared portions across the sub-blocks. For example, the encoder has already performed the steps of moving control flow of method 500 from block 510 to block 516 (of FIG. 5). The encoder determines portions of multiple sub-blocks of a block of data match one another (block 602). The encoder selects an integer (block 604). The range of integers is 1 to the number of portions less one. For example, when the received block of data has a size of 64 bytes and the encoder divided the block of data into eight 8-byte sub-blocks, there are 8 portions with each portion being a most significant byte of each sub-block in an example. Therefore, the set of integers from which to choose ranges from 1 to 7. The encoder calculates an input data size of sub-blocks by dividing the block of data less the integer number of copies of the portion by the number of sub-blocks (block 606). For example, when the block of data has a size of 64 bytes, the encoder divided the block of data into eight 8-byte sub-blocks, the portions are the most significant bytes of the sub-blocks, and the selected integer is 2, the encoder calculates the input data size of sub-blocks to be 64 bytes less 2 bytes (2 copies of the matching portion) divided by the sub-block size of 8 bytes. In this calculation, the input data size of sub-blocks is (64 bytes–2 bytes)/8 bytes=7.75. No available error correction scheme has an input data size that is a non-integer such as 7.75. Therefore, the encoder needs to select another integer and reiterate the steps.

If the calculated data size of sub-blocks does not match any input data size of available types of error correction schemes ("no" branch of the conditional block 610), and the encoder has not reached a last integer ("no" branch of the conditional block 612), then control flow of method 600 returns to block 604 where the encoder selects another integer. As described above, the set of integers from which to choose ranges from 1 to the number of portions less one. When there are 8 portions, the set of integers from which to choose ranges from 1 to 7.

If the calculated data size of sub-blocks does not match any input data size of available types of error correction schemes ("no" branch of the conditional block 610), and the encoder has reached a last integer ("yes" branch of the conditional block 612), then the encoder uses a default type of error correction scheme for transmitting the block of data (block 614). When the encoder uses the default type of error correction scheme, the total size of the output data is greater than the size of the received input block of data, since security data is added to the received input block of data. If the calculated data size of sub-blocks does match an input data size of an available type of error correction scheme ("yes" branch of the conditional block 610), then the encoder uses the matching type of error correction scheme for transmitting the block of data (block 616). When the encoder uses the matching type of error correction scheme, in some implementations, the size of the output block of data is no greater than the combined size of the input block of data and the security data. In some embodiments, the size of the output block of data is the same as the size of the received input block of data. The security data consumes data storage space made available by preventing to include, in the output block of data, one or more copies of the portion found in the input block of data.

It is noted, in some embodiments, the steps performed for methods 500 and 600 are used to generate a table similar to table 420 (of FIG. 4). Therefore, the iterative steps of method 500 and 600 are not continually performed over time. For example, the second row (entry) of table 420 shows that 12 bytes of original data are prevented from being included in the output block of data when matching portions are found across sub-blocks. For the parameters of a received block of data of 64 bytes, and dividing into 16 4-byte sub-blocks, the size of 12 bytes in field 426 is always true. Therefore, once this value is found, this value can be stored and retrieved for quick access, rather than re-calculated again. Therefore, as available error correction schemes are added and removed from the transmitter, the tables are updated and generation of the stored information is possible.

Figure 7:
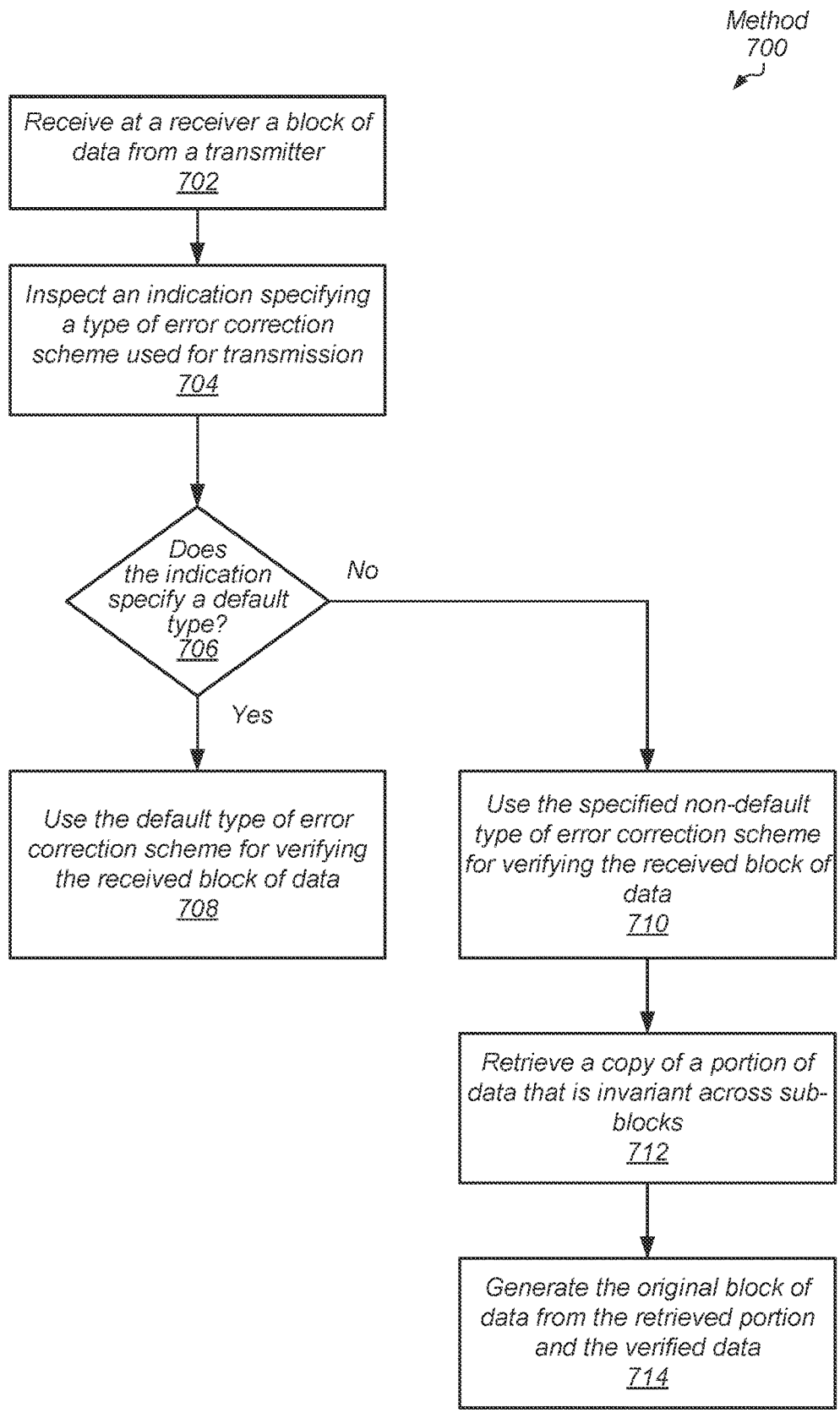
FIG. 7 is a generalized diagram of one embodiment of a method for efficiently transmitting data.

Referring now to FIG. 7, one embodiment of a method 700 for efficiently transmitting data is shown. A decoder at a receiver receives a block of data from a transmitter (block 702). The decoder inspects an indication specifying a type of error correction scheme used for transmission (block 704). In some embodiments, the indication is a multi-bit value stored in a particular field of a header or other metadata of the received block of data. The multi-bit value is decoded to determine the specified type of error correction scheme used for transmitting the block of data.

If the indication specifies a default type of error correction scheme ("yes" branch of the conditional block 706), then the decoder uses the default type of error correction scheme for verifying the received block of data (block 708). In such a case, the received block of data has a larger data size than the original block of data, since security data was added to the copy of the original block of data. After decoding, the resulting block of data will have a smaller size than the received block of data. For example, when the default type of error correction scheme is the Hamming code (72, 64, 8) scheme, the original block of data has a size of 64 bytes and each of 8 sub-blocks has a size of 8 bytes (64 bits). However, the encoder transmitted 72 bits per sub-block with 64 bits of original data and 8 bits of generated redundant bits for the security data. With 72 bits per sub-block and 8 sub-blocks, the total size of the transmitted block of data is 576 bits, or 64 bytes with 64 bits of generated redundant bits as security data.

If the indication specifies a non-default type of error correction scheme ("no" branch of the conditional block 706), then the decoder uses the non-default type of error correction scheme for verifying and possibly correcting the received block of data (block 710). In such a case, the received block of data has a same data size as the original block of data, since security data was added to the copy of the original block of data less one or more copies of the portions used in comparisons. The decoder retrieves a copy of a portion of data that is invariant across sub-blocks (block 712). For example, when the portions are the most significant bytes of the sub-blocks, at least one of the sub-blocks still includes a copy of the portion. The decoder generates the original block of data from the retrieved portion and the verified data (block 714).

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A circuit comprising:
an interface comprising circuitry configured to receive a first block of data to transmit;
circuitry configured to:
divide the first block of data into a first plurality of sub-blocks of data;
generate a second block of data comprising a sub-block of data for each of the first plurality of sub-blocks of data, wherein the second block of data:
includes a sub-block of data that does not include at least a portion of data of a corresponding sub-block of the first plurality of sub-blocks, responsive to the portion of data matching a portion of data in another sub-block of the first plurality of sub-blocks of data;
comprises security data generated using an error correction scheme; and
has a size that is no greater than a size of the first block of data.

2. The circuit as recited in claim 1, wherein the second block of data comprises a same number of sub-blocks as the first block of data.

3. The circuit as recited in claim 1, wherein the error correction scheme generates code words with a size equal to a size of a sub-block of the first plurality of sub-blocks.

4. The circuit as recited in claim 1, wherein the second block of data has a same size as the first block of data.

5. The circuit as recited in claim 1, wherein the circuitry is configured to:
generate a third block of data by removing, from the first block of data, one or more portions that match one another;
determine a given size by dividing a size of the third block of data by a number of the plurality of sub-blocks; and
select the error correction scheme from a plurality of error correction schemes based at least in part on a determination that the given size matches a data input size of the error correction scheme.

6. The circuit as recited in claim 1, wherein the circuitry is configured to:
select the error correction scheme based at least in part on the size of the second block of data less a size of the security data; and
use the error correction scheme to generate security data to include in the second block of data.

7. The circuit as recited in claim 6, wherein the circuitry is configured to insert an indication in metadata of the second block of data specifying the error correction scheme.

8. The circuit as recited in claim 1, based at least in part on a determination that no portions of the first plurality of sub-blocks match one another, generate a third block of data corresponding to the first block of data, wherein the third block of data has a larger size than a size of the first block of data.

9. A method comprising:
receiving, by an interface, a first block of data to transmit;
dividing, by a control unit, the first block of data into a first plurality of sub-blocks of data;
generating, by the control unit, a second block of data corresponding to the first block of data, wherein the second block of data:
includes a sub-block of data that does not include at least a portion of data of a corresponding sub-block of the first plurality of sub-blocks, responsive to the portion of data matching a portion of data in another sub-block of the first plurality of sub-blocks of data;
comprises security data generated using an error correction scheme; and
has a size that is no greater than the first block of data.

10. The method as recited in claim 9, further comprising generating the second block of data with a same number of sub-blocks as the first block of data.

11. The method as recited in claim 9, further comprising generating the second block of data to have a same size as the first block of data.

12. The method as recited in claim 9, further comprising:
generating a third block of data by removing, from the first block of data, one or more portions of the first plurality of sub-blocks of data that match one another;
determining a given size by dividing a size of the third block of data by a number of the plurality of sub-blocks; and selecting the error correction scheme from a plurality of error correction schemes based at least in part on a determination that the given size matches a data input size of the error correction scheme.

13. The method as recited in claim 9, further comprising:
selecting the error correction scheme from a plurality of error correction schemes based at least upon the size of the second block of data less a size of the security data; and
using the error correction scheme to generate security data to include in the second block of data.

14. The method as recited in claim 13, further comprising inserting an indication in metadata of the second block of data specifying the error correction scheme.

15. The method as recited in claim 9, wherein, in response to determining that no portions of first plurality of sub-blocks of data match one another, generating a third block of data corresponding to the first block of data, wherein the third block of data has a larger size than a size of the first block of data.

16. An apparatus comprising:
a plurality of transmitters comprising circuitry configured to send blocks of data;
a plurality of receivers comprising circuitry configured to receive blocks of data;
wherein one or more of the plurality of transmitters comprises an encoder;
wherein the encoder comprising circuitry comprises:
an interface configured to receive a first block of data to transmit;
an error correction unit comprising circuitry configured to support a plurality of error correction schemes, each scheme is configured to generate security data corresponding to data to transmit; and
a control unit comprising circuitry configured to:
divide the first block of data into a first plurality of sub-blocks of data;
generate a second block of data comprising a sub-block of data for each of the first plurality of sub-blocks of data, wherein the second block of data:
includes a sub-block of data that does not include at least a portion of data of a corresponding sub-block of the first plurality of sub-blocks, responsive to the portion of data matching a portion of data in another sub-block of the first plurality of sub-blocks of data;
comprises security data generated by the control unit using an error correction scheme; and
has a size that is no greater than the first block of data.

17. The apparatus as recited in claim 16, wherein the second block of data comprises a same number of sub-blocks as the first block of data.

18. The apparatus as recited in claim 16, wherein the second block of data has a same size as the first block of data.

19. The apparatus as recited in claim 16, wherein the control unit is configured to:
generate a third block of data by removing, from the first block, one or more portions of the first plurality of sub-blocks of data match one another;
determine a given size by dividing a size of the third block of data by a number of the plurality of sub-blocks; and
select a given error correction scheme of the plurality of error correction schemes based at least in part on a determination that the given size matches a data input size of the given error correction scheme.

20. The apparatus as recited in claim 16, wherein the control unit is configured to:
select a given error correction scheme of the plurality of error correction schemes based at least in part on the size of the second block of data less a size of the security data; and
use the given error correction scheme to generate security data to include in the second block of data.

* * * * *